(12) United States Patent
Collins

(10) Patent No.: US 9,438,100 B2
(45) Date of Patent: Sep. 6, 2016

(54) NON-TRANSFORMER ISOLATED DC-DC POWER SUPPLY INCLUDING SHUT DOWN CIRCUIT

(71) Applicant: Hamilton Sundstrand Corporation, Charlotte, NC (US)

(72) Inventor: Mark J. Collins, Windsor Locks, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 103 days.

(21) Appl. No.: 13/952,269

(22) Filed: Jul. 26, 2013

(65) Prior Publication Data

US 2015/0029618 A1    Jan. 29, 2015

(51) Int. Cl.
| | |
|---|---|
| *H02H 7/00* | (2006.01) |
| *H02M 1/32* | (2007.01) |
| *H02H 7/12* | (2006.01) |
| *H02H 7/125* | (2006.01) |

(52) U.S. Cl.
CPC ............. *H02M 1/32* (2013.01); *H02H 7/1213* (2013.01); *H02H 7/1252* (2013.01)

(58) Field of Classification Search
CPC .................................. H02M 3/158; H02M 1/32
See application file for complete search history.

(56) References Cited

U.S. PATENT DOCUMENTS

| | | | | |
|---|---|---|---|---|
| 4,513,341 | A | * | 4/1985 | Kollanyi ....................... 361/91.3 |
| 5,808,453 | A | * | 9/1998 | Lee et al. ...................... 323/224 |
| 2002/0130645 | A1 | * | 9/2002 | Tsai et al. ..................... 323/274 |
| 2008/0012542 | A1 | * | 1/2008 | Liu et al. ...................... 323/271 |

FOREIGN PATENT DOCUMENTS

EP    1328053 A2    7/2003

OTHER PUBLICATIONS

"EcoSpeed DC-DC Buck Controller with LDO and Hiccup Restart", http://www.semtech.com/images/datasheet/sc461.pdf, SemTech Corporation, 2012, pp. 1-31.
Extended European Search Report for related EP Application No. 14178272.2-1904, dated Dec. 17, 2014, pp. 1-9.

* cited by examiner

*Primary Examiner* — Thienvu Tran
*Assistant Examiner* — Tien Mai
(74) *Attorney, Agent, or Firm* — Cantor Colburn LLP

(57) ABSTRACT

A direct current-to-direct current (DC-DC) power supply includes a voltage converter module that converts an input voltage having a first voltage level into an output voltage having a second voltage level that is less than the first voltage level. An over-voltage detection module receives the second voltage and generates an over-voltage signal indicating an over-voltage condition of the DC-DC power supply. A shutdown module receives the over-voltage signal and generates a shutdown signal in response to the over-voltage condition. An over-voltage protection module interposed between the shutdown module and the input of the voltage converter module. The over-voltage protection module is configured to selectively inhibit delivery of the input voltage to the voltage converter module in response to the shutdown signal.

11 Claims, 3 Drawing Sheets

NON-TRANSFORMER ISOLATED DC-DC POWER SUPPLY INCLUDING SHUT DOWN CIRCUIT

BACKGROUND OF THE INVENTION

Various embodiments pertain to the art of direct current-to-direct current (DC-DC) power supplies, and more particularly, to over-voltage protection of non-transformer DC-DC power supplies.

Power supplies that convert a high level direct current (DC) input voltage to a low level DC output voltages typically include a means for protecting circuit components during a fault condition (e.g., a short circuit). For example, if a switching component used to drive the voltage converting unit is short circuited to the output, all digital circuits connected to the shorted output can be damaged.

Conventional DC-DC converter power supplies have addressed short circuit concerns by implementing a transformer isolation typology, which uses a transformer and switching element to convert the high voltage input to a low voltage output. Since the primary winding of the transformer is isolated from the secondary winding by an air gap, a shorted switching element will not propagate the higher input voltage onto the lower output voltage. The use of a transformer isolated topology also allows for overvoltage protection of the output by controlling the primary side switching element. However, the transformer circuitry is complex and costly requiring large components to convert the high voltage input to the low voltage output.

BRIEF DESCRIPTION

Disclosed is a direct current-to-direct current (DC-DC) power supply, comprising a voltage converter module, an over-voltage detection module, a shutdown module, and an over-voltage protection module. The voltage converter module includes an input that receives a first voltage having a first voltage level, and an output that provides a second voltage having a second voltage level that is less than the first voltage level. The over-voltage detection module is configured to receive the second voltage and to generate an over-voltage signal indicating an over-voltage condition of the voltage converter module based on the second voltage. The shutdown module is configured to receive the over-voltage signal and to generate a shutdown signal in response to the over-voltage condition. The over-voltage protection module is interposed between the shutdown module and the input of the voltage converter module. The over-voltage protection module is further configured to selectively inhibit delivery of the input voltage to the voltage converter module in response to the shutdown signal.

Also disclosed is a method of controlling a direct current-to-direct current (DC-DC) power supply. The method includes receiving a first voltage having a first voltage level, and converting the first voltage into a second voltage using a voltage converter module. The second voltage has a second voltage level that is less than the first voltage level. The method further includes comparing the second voltage level to a voltage threshold. The method further includes selectively inhibiting delivery of the input voltage to the voltage converter module using a protection unit in response to the second voltage level exceeding the voltage threshold.

BRIEF DESCRIPTION OF THE DRAWINGS

The following descriptions should not be considered limiting in any way. With reference to the accompanying drawings, like elements are numbered alike.

DETAILED DESCRIPTION OF THE EMBODIMENTS

A detailed description of one or more embodiments of the disclosed apparatus and method are presented herein by way of exemplification and not limitation with reference to the Figures.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality. In at least one embodiment of the present disclosure, a module may include a microcontroller as understood by those ordinarily skilled in the art.

Figure 1:
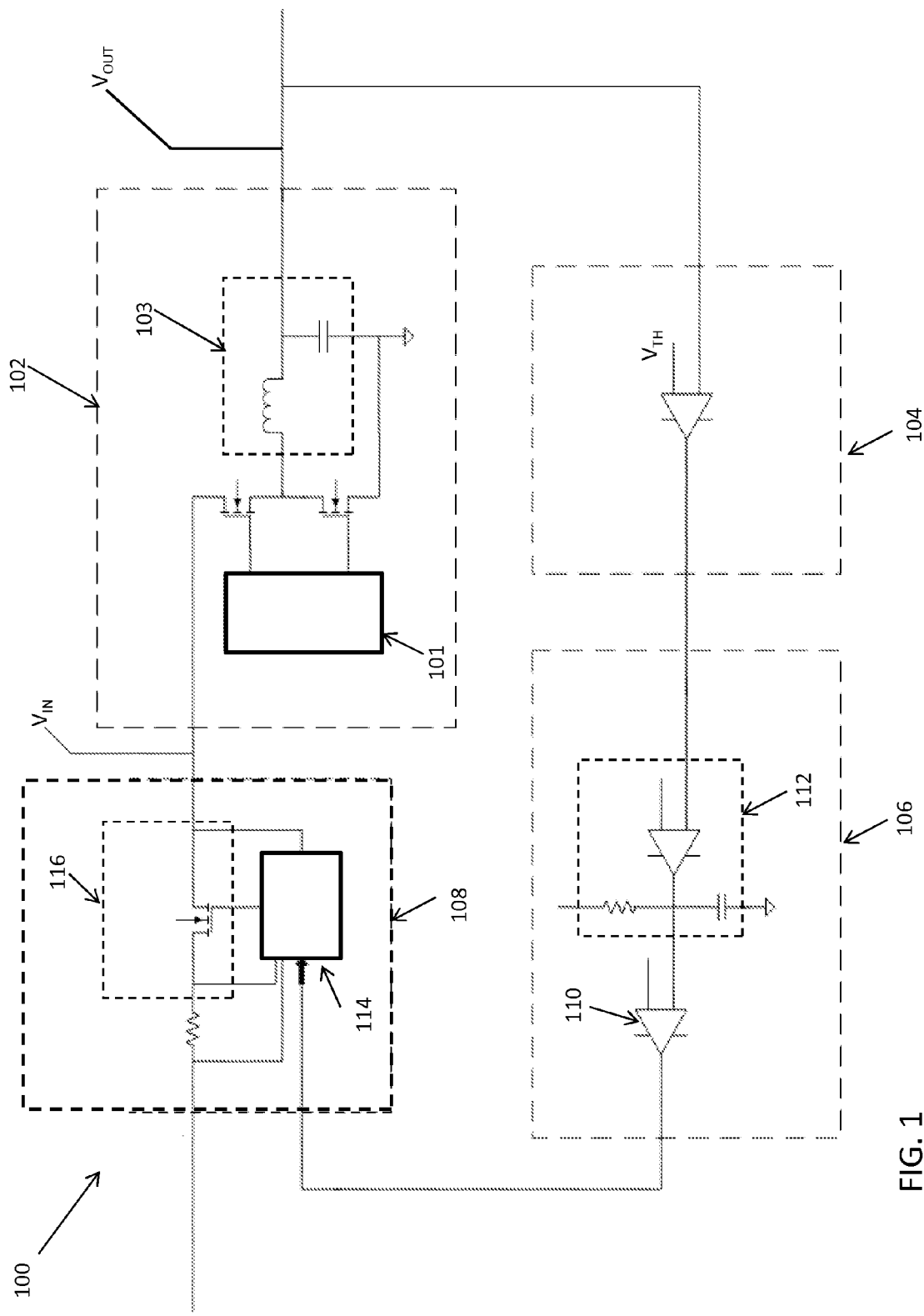
FIG. 1 is a block diagram of a direct current-to-direct current (DC-DC) power supply according to an embodiment.

Referring to FIG. 1, a direct current-to-direct current (DC-DC) power supply 100 is generally indicated. According to an embodiment illustrated in FIG. 1, the DC-DC power supply 100 is a non-transformer isolated DC-DC power supply. As a result, a more efficient and compact DC-DC power supply 100 capable of inhibiting damage caused by over-voltage events may be achieved (as compared to a transformer isolated topology). The direct current-to-direct current (DC-DC) power supply 100 includes a voltage converter module 102, an over-voltage detection module 104, a shutdown module 106, and an over-voltage protection module 108.

The voltage converter module 102 includes an input that receives a first voltage, for example an input DC voltage ($V_{IN}$), and an output for providing a second voltage, for example an output DC voltage ($V_{OUT}$). The $V_{IN}$ has a first voltage level and the $V_{OUT}$ has a second voltage level that is less than $V_{IN}$. In at least one embodiment, the voltage converter module 102 includes a switching regulator 101 that drives a converting circuit, such as a buck converter circuit. The converting circuit converts a high $V_{IN}$ (e.g., 28 V) to a low $V_{OUT}$ (e.g., 5 V), as understood by those ordinarily skilled in the art. The $V_{OUT}$ may be electrically connected to an output rail, which provides $V_{OUT}$ to one or more digitally electric components. The voltage converter module 102 may also include a filter 103 to achieve correct output regulation ($V_{OUT}$).

The over-voltage detection module 104 is in electrical communication with the output of the voltage converter module 102 and is configured to disconnect the input source from the output. More specifically, the over-voltage detection module 104 is configured to receive $V_{OUT}$ and to generate an over-voltage signal indicating an over-voltage condition of the voltage converter module 102. The over-voltage condition may include, for example, a short circuit between the input of the voltage converter module 102 and the output rail. In at least one embodiment, the over-voltage detection module 104 includes a comparator that determines the over-voltage condition based on a comparison between $V_{OUT}$ and a reference voltage indicating a voltage threshold ($V_{TH}$). If $V_{OUT}$ exceeds $V_{TH}$, then the over-voltage detection module 104 generates an over-voltage signal indicating the over-voltage condition, for example the existence of a short circuit event.

The shutdown module 106 is in electrical communication with the over-voltage detection module 104 and the over-voltage protection module 108 to initiate a shutdown procedure. The shutdown module 106 includes a switching unit 110 configured to generate a shutdown signal in response to receiving the over-voltage condition. In at least one embodiment, the shutdown module 106 includes a reset unit 112 interposed between the shutdown switch and the over-voltage detection module 104. The reset unit 112 is configured to control the shutdown module 106 to disable the shutdown signal based on a time delay. In at least one embodiment, the reset unit 112 is constructed as a time delay circuit as known by those ordinarily skilled in the art. The time delay circuit may determine a time period ($t_{SHUT\_OFF}$) during which the over-voltage signal is delivered to the switching unit 110 to initiate the shutdown procedure that shuts down DC-DC power supply 100. When $t_{SHUT\_OFF}$ expires, the over-voltage signal may be disabled, thereby resetting the DC-DC power supply 100 (e.g., when the overvoltage condition has been removed).

The over-voltage protection module 108 is electrically interposed between the shutdown module 106 and the input of the voltage converter module 102. The over-voltage protection module 108 includes a protection unit controller 114 and a protection unit 116. The protection unit controller 114 controls the protection unit 116 to selectively deliver the input voltage to the input of the voltage converter module 102. That is, the protection unit 116 may deliver the input voltage to the voltage converter module 102 or may inhibit delivery of the input voltage based on the control of the protection unit controller 114. In at least one embodiment, the protection unit 116 is a field effect transistor (FET), such as a metal oxide FET (MOSFET), which is enabled in response to a control signal as discussed below.

Figure 2:
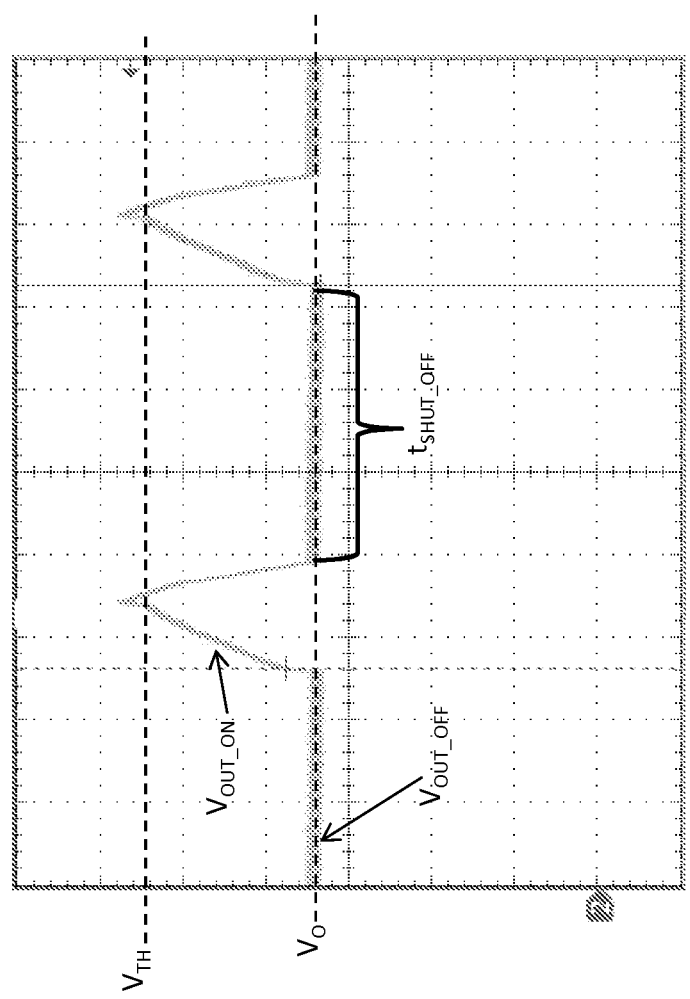
FIG. 2 is a signal diagram of a voltage protection operation performed by a DC-DC power supply according to an embodiment.

The protection unit controller 114 generates a control signal in response to receiving the shutdown signal from the shutdown module 106. The protection unit 116 selectively operates in an enabled mode and a disabled mode to inhibit the input voltage based on the control signal. In at least one embodiment, the enabled mode forms an electrically conductive path between the shutdown module 106 and the input of the voltage converter module 102 when the control signal is not generated. The disabled mode, however, disconnects (i.e., opens) the electrically conductive path when the control signal is generated. By disconnecting the conductive path, the input voltage is not supplied to the voltage converter module 102, which effectively disables (i.e., switches off) the voltage converter module 102. When a short circuit between the input of the voltage converter module 102 and the output rail occurs, for example, the high $V_{IN}$ is therefore removed from the output rail. Accordingly, damage of the digital electronics connected to the output rail may be avoided. In addition, the reset unit 112 allows the input voltage to remain disconnected for a long enough period of time to minimize component stress before being reapplied when the time delay ($T_{SHUT\_OFF}$) expires. If the over-voltage condition still exists after the voltage converter module 102 is turned back on, (i.e., $V_{OUT\_ON}$ exceeds $V_{TH}$), the shutdown procedure discussed in detail above is repeated and the voltage converter module 102 is disabled ($V_{OUT\_OFF}$) as illustrated in FIG. 2.

Figure 3:
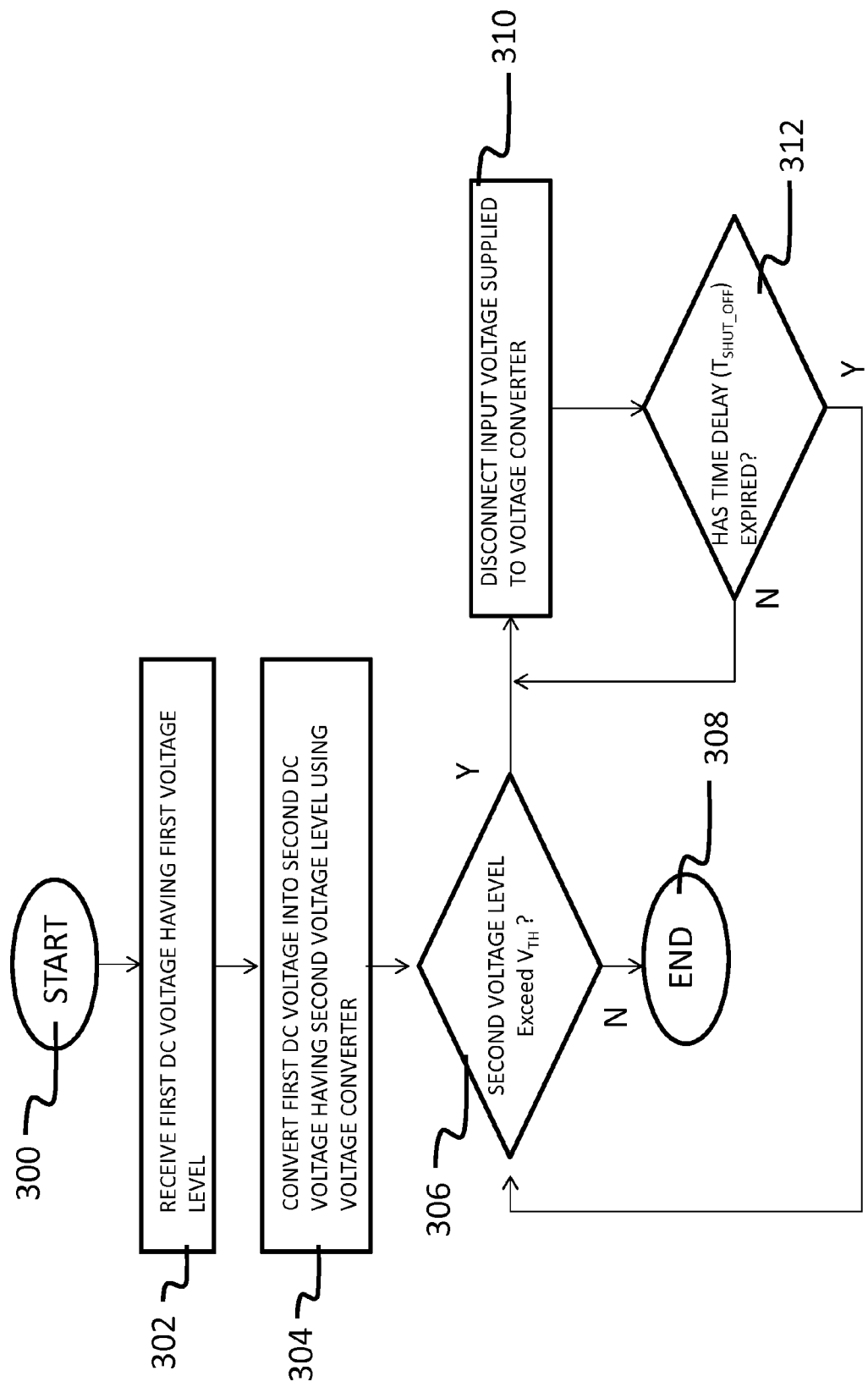
FIG. 3 is a flow diagram illustrating a method of controlling a DC-DC power supply according to an embodiment.

Referring now to FIG. 3, a flow diagram illustrates a method of controlling a DC-DC power supply according to an embodiment. The method begins at operation 300, and proceeds to operation 302 where a first voltage is received. The first voltage has a first voltage level (e.g., 28 V). At operation 304, the first voltage is converted into a second voltage having a second voltage level (e.g., 5 V). In at least one embodiment, a voltage converter, for example, a buck converter, may convert an input DC voltage (e.g., 28 V) to an output DC voltage (e.g., 5 V). At operation 306, the second voltage is compared to a voltage threshold ($V_{TH}$). If the second voltage does not exceed $V_{TH}$, the method ends at operation 308. Otherwise, the input voltage is disconnected from the voltage converter at operation 310. At operation 312, a determination is made as to whether a time delay for disconnecting the input voltage has expired. If the time delay has not expired, the method returns to operation 310 and the disconnection of the input voltage is continued. Otherwise, the method returns to operation 306, and the second voltage is again compared to $V_{TH}$.

While the various embodiments have been described with reference to an embodiment or embodiments, it will be understood by those skilled in the art that various changes may be made and equivalents may be substituted for elements thereof without departing from the scope of the invention. In addition, many modifications may be made to adapt a particular situation or material to the teachings of the embodiments without departing from the essential scope of the invention. Therefore, it is intended that the invention not be limited to the particular embodiment disclosed as the best mode contemplated for carrying out this invention, but that the invention will include all embodiments falling within the scope of the claims.

What is claimed is:

1. A direct current-to-direct current (DC-DC) power supply, comprising:
    a voltage converter module including an input that receives a first voltage having a first voltage level and an output that provides a second voltage having a second voltage level that is less than the first voltage level, the voltage converter module further including a switching regulator that drives a voltage converting circuit that converts the first voltage level into the second voltage level;
    an over-voltage detection module configured to receive the second voltage from the voltage converter module and to generate an over-voltage signal indicating an over-voltage condition of the DC-DC power supply based on the second voltage;
    a shutdown module configured to receive the over-voltage signal and to generate a shutdown signal in response to the over-voltage condition; and
    an over-voltage protection module having an output terminal connected directly to the voltage converting circuit and first and second input terminals, the first input terminal connected to a power supply generating the first input voltage, and the second input terminal connected directly to only the output of the shutdown module so as the over-voltage protection module is interposed between the shutdown module and the input of the voltage converting circuit included in the voltage converter module such that the shut-down module is not directly connected to the switching regulator, the over-voltage protection module configured to selectively inhibit delivery of the input voltage to the voltage converter module in response to the shutdown signal,
    wherein the over-voltage protection module includes a controller in electrical communication with a protection unit, the protection unit selectively operable in an enabled mode and a disabled mode to control supply of the input voltage.

2. The DC-DC power supply of claim 1, wherein the protection unit controls the input voltage supplied to the voltage converter module based on a control signal output by the controller in response to the shutdown signal.

3. The DC-DC power supply of claim 2, wherein the enabled mode forms an electrically conductive path from the over-voltage protection module to the input of the of the voltage converter module when the control signal is not generated, and the disabled mode disconnects the electrically conductive path in response to generating the control signal.

4. The DC-DC power supply of claim 3, wherein the shutdown module includes a reset unit configured to inhibit output of the shutdown signal based on a time delay.

5. The DC-DC power supply of claim 4, wherein the over-voltage detection module detects the over-voltage condition based on a comparison between the second voltage and a voltage threshold.

6. The DC-DC power supply of claim 5, wherein the over-voltage detection module generates the over-voltage signal in response to the second voltage level exceeding the voltage threshold.

7. The DC-DC power supply of claim 6, wherein the protection unit is a field effect transistor (FET).

8. A method of controlling a direct current-to-direct current (DC-DC) power supply, comprising:
receiving a first voltage having a first voltage level;
converting the first voltage into a second voltage using a switching regulator that drives a voltage converting circuit included in a voltage converter module and outputting the second voltage, the second voltage having a second voltage level that is less than the first voltage level;
comparing the second voltage level to a voltage threshold using an electronic shutdown module;
selectively supplying the input voltage to the voltage converter module using a protection unit based on the comparison;
forming an electrically conductive path from the protection unit to the input of the switching regulator when the second voltage does not exceed the voltage threshold; and
disconnecting the electrically conductive path when the second voltage exceeds the voltage threshold such that the voltage converter circuit is does not receive the first voltage; and
protecting the voltage converting circuit by connecting an output terminal of an over-voltage protection module directly to the voltage converting circuit, connecting a first input terminal to a power supply generating the first voltage, and connecting a second input terminal connected directly to only an output of the shutdown module so as the over-voltage protection module is interposed between the shutdown module and the input of the voltage converting circuit included in the voltage converter module such that the shutdown module is not directly connected to the switching regulator, the over-voltage protection module configured to selectively inhibit delivery of the input voltage to the voltage converter module in response to receiving a shutdown signal output from the shutdown module based on the comparison.

9. The method of claim 8, wherein the selectively supplying the input voltage further comprises selectively delivering current to the voltage converter module based on the comparison.

10. The method of claim 9, further comprising disconnecting the electrically conductive path in response to the second voltage exceeding the voltage threshold.

11. The method of claim 10, further comprising re-connecting the electrically conductive path after a duration of time.

* * * * *